Figure 1:
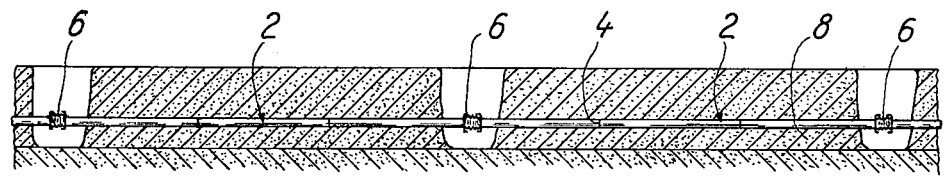

United States Patent [19]

Thastrup

[11] 3,932,922

[45] Jan. 20, 1976

[54] PIPE SYSTEMS FOR HOT MEDIA

[75] Inventor: Ove Thastrup, Fredericia, Denmark

[73] Assignee: A/S E. Rasmussen, Denmark

[22] Filed: Apr. 22, 1974

[21] Appl. No.: 463,184

[30] Foreign Application Priority Data

Apr. 26, 1973 United Kingdom............... 19907/73

[52] U.S. Cl. ..................... 29/405; 29/446; 61/72.1
[51] Int. Cl.² ................. B23P 11/00; B21D 39/04; F16L 1/02
[58] Field of Search ....... 29/405, 446, 452; 61/72.1; 285/226, 286, 300

[56] References Cited
UNITED STATES PATENTS

| | | | |
|---|---|---|---|
| 2,862,729 | 12/1958 | Bredtschneider............... | 285/226 X |
| 3,630,038 | 12/1971 | Ando ................................... | 61/72.1 |
| 3,650,429 | 3/1972 | Ribout............................ | 285/226 X |
| 3,654,691 | 4/1972 | Willhite et al. ........................ | 29/446 |
| 3,788,083 | 1/1974 | Lundgren............................ | 61/72.1 |

Primary Examiner—Lowell A. Larson
Assistant Examiner—E. M. Combs
Attorney, Agent, or Firm—Craig & Antonelli

[57] ABSTRACT

A method of establishing pipe systems for hot media, such as subterranean district heating pipe systems, comprising arranging a number of pipe lengths in continuity of each other with a certain spacing between the adjacent ends thereof, and interconnecting these ends by means of relatively short, axially easily compressible conductor elements such as tube bellows, whereafter the pipe lengths are axially expanded by sending a hot medium through the pipe system thus assembled, until the single pipe lengths, at a temperature below the expected maximum operational temperature of the system, have expanded sufficiently to cause the adjacent pipe length ends to abut against each other, whereafter these pipe length ends, by welding, bolting or otherwise, are joined rigidly to each other. Hereby the pipes may be anchored rigidly to their surroundings and be subjected to temperature variations without the lack of thermal movability of the pipes causing unpermissible stress in the pipes.

8 Claims, 3 Drawing Figures

U.S. Patent    Jan. 20, 1976    3,932,922

PIPE SYSTEMS FOR HOT MEDIA

The present invention relates to the construction of pipe systems for hot media, especially though not exclusively to subterranean pipe systems for district heating water. Such pipe systems are normally made of a large number of heat insulated iron tubes or pipe lengths which are joined end to end by welding or in any other tight and rigid manner, and in the system there is included a number of bendings, branchings, stop valves, etc. The mounting of the system, of course, must be done generally at the relatively low outdoor temperature which is much lower than the normal operation temperature of the system, e.g. 70°–130°C for district heating water, and for this reason, as well known, thermal expansion problems are likely to occur. In order to allow the pipes to expand when they become heated it is customary practice to include in the system, at selected points thereof, a number of expansion loops or bellow-like axial compensators, but the use thereof involves some disadvantages, not the least being economy, because these units should be made so as to remain tight and operative for many years.

It is known that the pipes should not necessarily be alllowed to expand and contract, since if they are anchored in the ground the inherent resiliency of the iron pipes may take up the expansion and contraction forces at least to a large degree. It has been suggested, therefore, to mechanically prestretch the pipes prior to the anchoring, and the joining of the pipes. When the mechanically supplied stretch is thereafter relieved the cold pipes will tend to contract, but this is impossible due to the anchoring of the pipes in the ground, and instead a resilient stretch tension will occur in the pipes. When the pipe system is heated later on the pipes will tend to expand, but this only results in the stretch tension being reduced. The degree of pre-stretching is chosen so as to cause the stretch tension to completely disappear when the temperature has risen approximately midways up to the maximum operational temperature, whereafter by further heating the expansion tendency of the pipes will be converted into a resilient compression tension in the pipes. However, in this manner the degree of compression will be smaller than if no pre-stretching was used, and in view of the practical limits of stretch and compression tension in iron tubes it has been possible to hereby reduce the final compressive stress sufficiently to enable a rigid mounting of the pipes when the difference between the cold mounting temperature and the maximum operational temperature is of the magnitude 100°C, such as being actual in district heating systems. Thus it is possible to avoid expansion loops and axial compensators, but of course the mechanical pre-stretching of the pipes is rather difficult to carry out.

According to another known method which is easier to carry out the pipe system is mounted in open trenches whereafter water of a temperature approximately midways between the "cold" temperature and the maximum temperature at which the system shall normally be in operation is sent through the system; when the pipes are heated to this average temperature they will assume an expanded position corresponding to the pre-stretched condition, and this condition will be maintained when the trenches are thereafter filled with earth. It has been found that the earth pressure on the pipes may be sufficient to prevent actual expansion and contraction of the pipes, so when the pipes are later heated to full operation temperature the further expansion will be taken up by resiliency of the tubes. In this manner the tension in the pipes will vary between a stretch tension when the pipes are cold and a compression tension of approximately the same numeric value when the pipes are heated maxinmally, i.e. the advantage obtained is the same as in the pre-stretched system, but additionally the difficult stretching work is avoided. This method, however is disadvantageous in that the trenches should be held open until the entire system or system section has been mounted, i.e. considerable traffic inconveniences will be involved, and for practical, reasons it can be difficult to supply the heating medium with only approximately half its normal temperature.

More specifically present invention relates to a method of establishing pipe systems for hot media, such as subterranean district heating pipe systems, comprising mounting a number of pipe lengths in continuity of each other and joining the ends of the pipe lengths with the pipe lengths assuming a stretched condition, and it is the purpose of this invention to provide an improved mounting method whereby the trenches can be filled along the major part of their length immediately upon mounting of the pipes, and according to which there will be no need to furnish heating medium having an intermediate temperature, nor to make use of a mechanical pre-stretching of the pipes.

According to the invention the pipe lengths are mounted with a certain spacing between the adjacent ends thereof, these ends being interconnected by means of relatively short, axially easily compressible conductor elements such as tube bellows, whereafter the stretching of the pipe lengths is effected by sending a hot medium through the pipe system thus assembled, until the single pipe lengths, at a temperature below the expected maximum operational temperature of the system, have expanded sufficiently to cause the adjacent pipe length ends to abut against each other, whereafter these pipe length ends, by welding, bolting or otherwise, are joined rigidly to each other.

With this method the pipe system is made conductive of the hot medium before it is finally assembled and locked against thermal movements, and the system is easily so arranged that the rigid pipe length ends will engage each other when the pipes have been heated to an intermediate temperature, whereafter for the final joining work it will be unimportant whether the temperature rises further, since the pipe lengths cannot expand further anyway. This involves that the hot medium can be supplied for causing the desired thermal expansion of the pipes, and furthermore the pipe trenches may be filled with earth except at the local places in which the bellow units shall be accessible for the final joining, i.e. the system can be established with a minimum of traffic inconvenience. After the final joining of the pipe ends the pipe system may have the same character as a system established according to any of the described two known methods, but the total mounting thereof has taken place in a much more convenient manner.

The invention also comprises a pipe system established acording to the described method, as well as a special pipe joining unit as defined in the appended claims.

Figure 2:
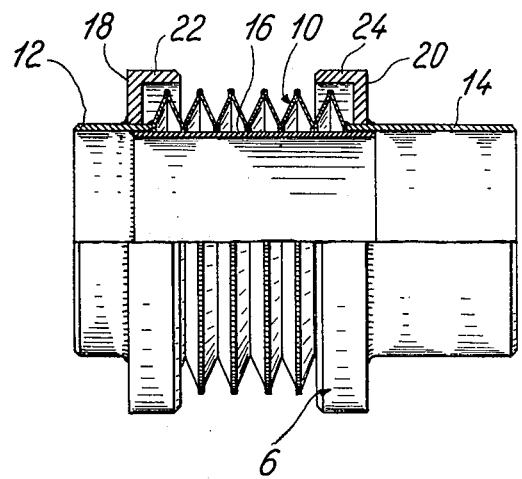
Figure 3:
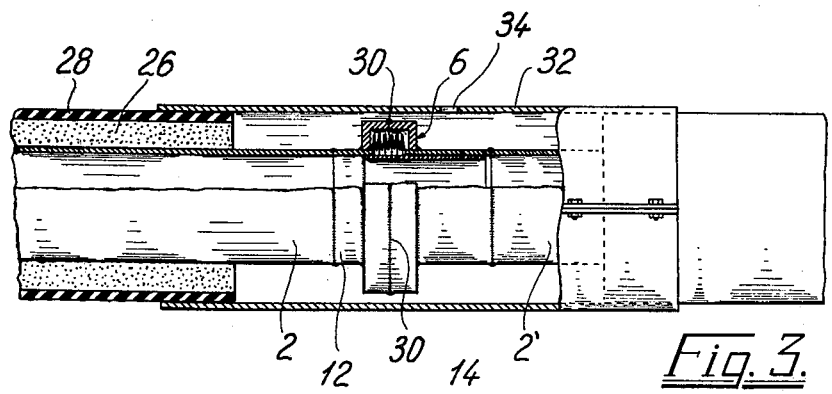

By way of example the invention is desribed in more detail in the following with reference to the accompanying drawing, in which:

FIG. 1 is a longitudinal sectional view of a partly earth filled trench in which there is mounted a hot water pipe, FIG. 2 is a sectional view of a bellows unit for use in the pipe, and FIG. 3 is a sectional view of the bellows unit in its finally mounted position.

In FIG. 1 is shown a pipe made of a number of pipe sections 2 joined end to end at a number of joints 4. In some of the joints there is mounted a bellows structure 6 between the adjoining pipe ends, as explained in more detail below. The pipe is laid in a trench 8 which has been filled with earth when the joints 4 have been established and the pipe has been pressure tested. Only adjacent the bellows 6 the trench is temporarily maintained open for allowing access to the bellows. If desired the pipe lengths between the bellows units 6 may be rigidly anchored in the ground midways between each pair of bellows units 6 by means of anchoring means (not shown) well known in the art.

After the said pressure testing of the pipe hot water at the full operational temperature of the district heating system is sent through the pipe. If the trench was not filled with earth the pipe lengths between the bellows would hereby immediately start to expand as the temperature rises, but in the earth filled trenches the pipes shall first overcome the friction with the earth, so a certain compressive stress will be built up in the pipe lengths before the pipes actually start expanding, this stress being highest midways between the bellows units 6 while falling to zero towards the pipe ends adjacent these units. However, as the temperature rises further the pipes will expand so as to cause the bellows 6 to be compressed, until the rigid pipe ends engage each other so as to mechanically prevent further expansion of the pipes.

The distance between the rigid ends of the pipe lengths is so adapted that these ends will engage each other prior to the pipe lengths having reached the full operational temperature, e.g. midways between the intermediate temperature and the operational temperature. The pipe material adjacent the said rigid pipe ends will be substantially unstressed until these ends engage each other, but thereafter, by the further rising of the temperature, a resilient compressive stress will be built up also at these places, and due to the earth friction this stress will be transferred with decreasing strength towards the middle of each pipe length between the bellows units 6. The resulting stress in the pipes may even be a compressive stress of the same strength throughout the length of the pipes.

As soon as the rigid pipe ends have engaged each other these ends are joined in a rigid and watertight manner, e.g. as described in more detail below, and the trench holes at the bellows units 6 are filled with earth, whereafter the pipe system has been finally mounted.

Should the pipes later on get cooled e.g. in connection with repair, the result of the cooling will be a reduction of the compressive strength to zero and thereafter, by further cooling to the temperature of the surroundings, a tensile stress will be produced in the pipes, since the bellows units 6 are now unable to expand. By renewal heating the former compressive stress will be reestablished, and no actual thermal movements of the pipes will take place.

The construction of a preferred embodiment of the bellows units 6 is shown in FIG. 2. A bellows member 10 is interposed between a short tube 12 and a longer tube 14, and to the short tube 12 there is secured an inner tube 16 projecting telescopically into the tube 14 through the bellows member 10 so as to serve as a guiding member when the bellows is compressed. To each of the tubes 12 and 14 there is secured a exterior annular flange 18 and 20, respectively, these flanges having cylindrical edge portions 22 and 24, respectively, projecting towards each other.

The bellows unit is adapted to be secured to adjacent pipe ends as a connection tube therebetween, and as shown in FIG. 3 the short tube 12 is welded to the end of a pipe 2 and the longer tube 14 is welded to the end of the adjoining pipe 2', these pipes being of the prefabricated heat insulated type surrounded by a layer of a heat insulating material 26 which is again surrounded by an exterior protective tube 28, preferably made of plastics. At joints 4, FIG. 1, in which no bellows units are placed, the pipe ends projecting from the insulation material are joined by welding, and when thereafter the pipe system or the particular section thereof has been pressure tested a tube casing as shown at 32 in FIG. 3 is placed at each joint 4 so as to sealingly bridge the space between the adjacent ends of the outer protective tubes 28, all according to well known principles as described e.g. in our British Pat. Specification No. 1,312,831. An insulating foam material is introduced into the tube casing through an upper hole 34 therein, and this hole is thereafter sealingly closed by means of a stopper (not shown).

The bellows units 6 are left accessible when after the said pressure testing the pipe trench is filled with earth, and thereafter hot water is sent through the pipes. By the resulting pipe expansion, as described hereinbefore, the bellows elements 10 will get compressed, and the rigid pipe ends constituted by the opposed flange portions 22 and 24 will be brought to abut against each other when the pipe temperature has risen to a value below the higher temperature of the hot water, and thereafter the flange portions 22,24 are rigidly joined, preferably by welding as shown at 30 in FIG. 3. Thereafter the bellows joints are finished by the mounting of the tube casings 32, and the trench holes are filled with earth.

It will be appreciated that with the use of the bellows units shown in FIG. 2 it is obtained that the bellows element 10 in the final position of the unit will be completely and sealingly enclosed within a heavy tube portion constituted by the flanges 18 and 20, whereby the bellows element itself should not be adapted so as to be able to remain tight for many years. It can be considered as a temporary mounting aid only.

On the other hand the invention is not limited to the use of this particular bellows unit, since the final joining of the pipe ends may well be otherwise effected, e.g. by bolting or snap locking of suitable flange means associated with the pipe ends, these ends at least by the mounting work being interconnected by length variable tube elements which are relatively easy to compress axially.

In the above description of the initial thermal expansion of the pipes it has been presupposed that the earth is frictionally active, i.e. that the insulating material forms a stiff connection between the iron tube and the protective tube, this actually being the preferred arrangement. Principally, however, it would be possible to make use of pipes in which the insulating material cannot transfer the displacement forces between the two concentric pipes, e.g. if the interior pipe is slidable in the insulating material, but in that case the iron pipe should be anchored to the surroundings, in a manner known per se, at some places along a straight pipe length, preferably at places midways between the bellows units 6.

As a practical example the length of the pipe between two bellows units can be 108 *m*, viz. a pipe length made of 18 pipe elements each having a length of 6 meters, and the initial gap between the bellows flanges 22 and 24 may then be ca. 65 mm, when the difference between the cold mounting temperature and the maximum operational temperature amounts to ca. 100°. Calculations relating to the placing and the width of the initial gap of the bellows units for obtaining the described character of the system are easily carried out by the relevant experts.

Despite the use of the term bellows unit it will be appreciated that these units may comprise, instead of a bellows element, a hose element or any other length variable tube element.

What is claimed is:

1. A method of laying pipe systems for conducting a hot fluid, such as subterranean heating pipe systems, the method comprising the steps of:

disposing a plurality of fluid conducting lengths of pipe in axial alignment, with the ends of adjacent pipe lengths being spaced at a predetermined distance;

providing axially compressible fluid conductor elements between said adjacent pipe length ends which interconnect said lengths of pipe to form a fluid-tight connection therebetween;

axially expanding said lengths of pipe by conducting a hot fluid, at a temperature below the expected maximum operational temperature of the pipe system, through the assembled fluid conducting lengths of pipe and fluid conductor elements until the ends of adjacent pipe lengths are brought into engagement thereby compressing the axially compressible fluid conductor elements; and securing the lengths of pipe by rigidly joining the engaged ends thereof in a sealed manner.

2. A method according to claim 1, wherein the securing of said pipe length ends is effected by providing radially outwardly projecting flange portions on the ends of adjacent pipe lengths which are positioned for mating engagement upon compression of said fluid conductor elements, bringing said flange portions into abutting relationship during the conducting of the hot fluid through the pipe system, and thereafter rigidly joining the abutting flange portions to form a tight casing around the axially compressed fluid conductor elements.

3. A method of laying subterranean pipe systems for conducting a hot fluid, the method comprising the steps of: disposing a plurality of fluid conducting lengths of pipe in axial alignment with the ends of adjacent pipe lengths being spaced at a predetermined distance; providing axially compressible fluid conductor elements between the ends of said adjacent pipe lengths so as to form a fluid tight connection bridging the spacing between adjacent pipe ends; providing radially outwardly projecting flange portions on the ends of adjacent pipe lengths which are positioned for mating engagement upon compression of the axially compressible fluid conductor elements disposed between said pipe length ends; conducting a hot fluid through the assembled fluid conducting lengths of pipe and fluid conductor elements until said flange portions of adjacent pipe lengths are brought into mating engagement thereby compressing the axially compressible fluid conductor elements; and securing the adjacent pipe lengths by rigidly joining the engaged flange portions in a sealed manner to form a tight casing around the axially compressed fluid conductor elements.

4. A method according to claim 3, wherein the step of disposing the plurality of fluid conducting lengths of pipe includes spacing the ends of adjacent pipes so that the predetermined distance therebetween is less than the expected expansion of the pipe lengths at the normal operational temperature of the hot fluid.

5. A method according to claim 4, wherein the step of conducting a hot fluid through the assembled fluid conducting lengths of pipe and fluid conductor elements includes supplying a fluid at a a temperature below the expected maximum operating temperature of the hot fluid.

6. A method according to claim 5, wherein the step of disposing the axially compressible fluid conductor element includes welding the respective ends of an axially compressible element to the respective ends of adjacent pipe lengths.

7. A method according to claim 6, wherein the step of securing adjacent pipe lengths includes welding the flange portions of respective fluid conductor elements to each other.

8. A method according to claim 6, wherein the step of securing adjacent pipe lengths includes bolting the flange portions of respective fluid conductor elements to each other.

* * * * *